(12) United States Patent
Hoult et al.

(10) Patent No.: US 9,250,127 B2
(45) Date of Patent: Feb. 2, 2016

(54) SPECTROSCOPIC INSTRUMENTS AND FOOT PORTIONS FOR SPECTROSCOPIC INSTRUMENTS

(75) Inventors: Robert Alan Hoult, Beaconsfield (GB); Dave Gosbee, Linslade Leighton Buzzard (GB)

(73) Assignee: PerkinElmer Singapore PTE Ltd., Singapore (SG)

( * ) Notice: Subject to any disclaimer, the term of this patent is extended or adjusted under 35 U.S.C. 154(b) by 162 days.

(21) Appl. No.: 13/994,588

(22) PCT Filed: Dec. 1, 2011

(86) PCT No.: PCT/GB2011/001675
§ 371 (c)(1),
(2), (4) Date: Nov. 26, 2013

(87) PCT Pub. No.: WO2012/080688
PCT Pub. Date: Jun. 21, 2012

(65) Prior Publication Data
US 2014/0125974 A1 May 8, 2014

(30) Foreign Application Priority Data
Dec. 17, 2010 (GB) .................................. 1021578.8

(51) Int. Cl.
*F16F 13/00* (2006.01)
*G01J 3/02* (2006.01)
(Continued)

(52) U.S. Cl.
CPC .............. *G01J 3/0291* (2013.01); *F16F 13/08* (2013.01); *F16M 13/005* (2013.01); *G01J 3/02* (2013.01); *G01J 3/0202* (2013.01); *Y10T 29/49993* (2015.01)

(58) Field of Classification Search
CPC ......... F16F 13/08; F16F 13/085; F16F 13/10; G01J 3/0291; G01J 3/02; G01J 3/0202; F16M 13/005; Y10T 29/49993
USPC ........... 248/188.8, 188.9, 615, 677, 560, 562, 248/565, 599, 600, 616, 618, 619, 621, 624, 248/631, 636, 638; 267/140.13, 121; 720/692–694; 361/679.59
See application file for complete search history.

(56) References Cited

U.S. PATENT DOCUMENTS 2,597,800 A * 5/1952 Hussman ...................... 248/565
2,896,937 A * 7/1959 Miller ........................... 267/134
(Continued)

FOREIGN PATENT DOCUMENTS

| CA | 2181619 A1 | 5/1997 |
| DE | 3507835 A1 | 10/1986 |
| GB | 2132734 A | 7/1984 |

OTHER PUBLICATIONS

"Anti-Vibration Bases" Accessed Aug. 20, 2010. www.automotioncomponents.co.uk.
(Continued)

*Primary Examiner* — Ingrid M Weinhold
(74) *Attorney, Agent, or Firm* — Lando & Anastasi, LLP

(57) ABSTRACT

A spectroscopic instrument (1) comprising at least one load bearing anti-vibration foot portion (3) for supporting the instrument on a surface. Each foot portion (3) comprises a load bearing elastomeric portion (5) and an internal stub portion (4) which is provided within the elastomeric portion and which is rigid compared to the elastomeric portion. An internal wall of the elastomeric portion (5) is spaced from an external wall of the stub portion (4) such that the elastomeric portion (5) is moveable relative to the stub portion (4) to absorb vibration. Liquid is provided in the spacing between the internal wall of the elastomeric portion (5) and the external wall of the stub portion (4) to damp such movement.

13 Claims, 3 Drawing Sheets

(51) Int. Cl.
  *F16F 13/08*    (2006.01)
  *F16M 13/00*    (2006.01)

(56) References Cited

U.S. PATENT DOCUMENTS

| | | | | |
|---|---|---|---|---|
| 3,346,221 | A * | 10/1967 | Everett | 267/140.13 |
| 3,947,007 | A * | 3/1976 | Pelat | 267/140.13 |
| 4,159,091 | A * | 6/1979 | Le Salver et al. | 267/140.13 |
| 4,955,588 | A * | 9/1990 | Reuter et al. | 267/140.13 |
| 5,094,433 | A * | 3/1992 | Dan et al. | 267/140.13 |
| 5,707,048 | A * | 1/1998 | Kuzukawa et al. | 267/140.13 |
| 5,860,638 | A * | 1/1999 | Wolf et al. | 267/140.13 |
| 5,988,610 | A * | 11/1999 | Hiraki et al. | 267/140.13 |
| 6,439,551 | B1 * | 8/2002 | Kato | 267/113 |
| 6,452,179 | B1 * | 9/2002 | Coates et al. | 250/339.09 |
| 2005/0056980 | A1 * | 3/2005 | Kuzukawa | 267/140.4 |
| 2005/0285318 | A1 * | 12/2005 | Winkler | 267/140.13 |
| 2006/0134980 | A1 | 6/2006 | Park | |
| 2007/0259141 | A1 | 11/2007 | Ohki | |
| 2009/0014930 | A1 * | 1/2009 | Kuzukawa | 267/140.13 |
| 2010/0213650 | A1 * | 8/2010 | Katayama et al. | 267/118 |
| 2012/0049038 | A1 * | 3/2012 | Bachmeyer et al. | 248/624 |

OTHER PUBLICATIONS

"Anti-Vibration Mounts" Accessed Aug. 20, 2010. www.automotioncomponents.co.uk.

"Anti-Vibration Spring Dampeners" Accessed Aug. 20, 2010. www.automotioncomponents.co.uk.

"Machinery Mounts". Accessed Aug. 20, 2010. www.barrycontrols.com/products.

RINO "Anti-Vibration Mounts—Vibration Isolation". www.rino.co.uk.

* cited by examiner

SPECTROSCOPIC INSTRUMENTS AND FOOT PORTIONS FOR SPECTROSCOPIC INSTRUMENTS

CROSS-REFERENCE TO RELATED APPLICATIONS

This application is a National Stage Application under 35 U.S.C. §371 of International Patent Application No. PCT/GB2011/001675 filed on Dec. 1, 2011 and titled "SPECTROSCOPIC INSTRUMENTS AND FOOT PORTIONS FOR SPECTROSCOPIC INSTRUMENTS", which claims priority to United Kingdom Patent Application No. 1021578.8, filed on Dec. 17, 2010, both of which are hereby incorporated herein by reference in their entireties for all purposes.

BACKGROUND OF THE INVENTION

This invention relates to spectroscopic instruments supported by at least one anti-vibration foot portion and also to anti-vibration foot portions for use in supporting spectroscopic instruments.

Many types of instruments are susceptible to vibration arising from external sources and there is consequently need for anti-vibration mountings of one kind or another. One particular set of such instruments are spectroscopic instruments which are supported on feet or foot portions. Such instruments need vibration isolation and sometimes are deliberately moved from one location to another by sliding the instrument across the mounting surface on its feet.

Consequently the foot portions provided to support spectroscopic instruments need to be able to satisfactorily provide vibration isolation, and also support the instrument in a way which does not give rise to dangerous or alarming wobbling of the instrument and furthermore the foot portions should be able to withstand deliberate moving of the instrument by sliding across the supporting surface.

It is an object of the present invention to provide such foot portions.

SUMMARY OF THE INVENTION

According to one aspect of the present invention there is provided a spectroscopic instrument comprising at least one load bearing anti-vibration foot portion for supporting the instrument on a surface, the foot portion comprising a load bearing elastomeric portion and an internal stub portion which is provided within the elastomeric portion and which is rigid compared to the elastomeric portion, wherein an internal wall of the elastomeric portion is spaced from an external wall of the stub portion such that the elastomeric portion is moveable relative to the stub portion to absorb vibration and liquid is provided in the spacing between the internal wall of the elastomeric portion and the external wall of the stub portion to damp such movement.

With such an arrangement whilst the elastomeric portion is bearing at least some of the weight of the instrument, damped movement of the elastomeric portion can absorb vibration whilst the presence of the stub can serve to restrict transverse movement of the elastomeric portion to some degree.

The elastomeric portion may be generally flared having a first portion and a second portion, where the first portion has a larger transverse extent than the second portion. The first portion may be closer to the body of the instrument than the second portion.

The second portion may comprise said internal wall, and said liquid may be provided in the region of the second portion of the elastomeric portion. A spacing between the elastomeric portion and the stub portion may be smaller in the region of the second portion than in the region of the first portion.

The elastomeric portion may be generally cup shaped, with a base portion for contacting with a surface on which the instrument is to be supported.

The elastomeric portion may have a circular annular cross-section, the diameter of the annulus may vary along the length of the elastomeric portion. The elastomeric portion may have a first hollow cylindrical portion with a first internal diameter, a second hollow cylindrical portion with a second, smaller, internal diameter and may have a flared portion between the first and second cylindrical portions.

The first portion of the elastomeric portion may comprise the first cylindrical portion. The second portion of the elastomeric portion may comprise the second cylindrical portion.

The second cylindrical portion may comprise said internal wall of the elastomeric portion.

A liquid reservoir may be provided within the elastomeric portion. The stub portion may comprise an internal bore, at least part of which may be occupied by at least part of the liquid reservoir. The bore may vary in diameter along its length. The portion of the bore including the liquid reservoir may be of larger diameter than at least one other portion of the bore.

The liquid in the internal bore of the stub may be in fluid communication with the liquid provided in the spacing between the internal wall of the elastomeric portion and the external wall of the stub portion via an open end of the stub portion.

A vent aperture may be provided in the stub. The vent aperture may allow fluid communication between a region in the bore of the stub which is above the level of the liquid in the bore during normal operation and a region between the external wall of the stub portion and the internal wall of the elastomeric portion which is above the level of the liquid in the spacing between the external wall of the stub portion and the internal wall of the elastomeric portion during normal operation.

The stub portion may have a first portion and a second portion, where the first portion has a larger transverse extent than the second portion. The first portion may be closer to the body of the instrument than the second portion. The stub portion may be stepped.

The stub portion may be generally cylindrical, the diameter of the cylinder may vary along the length of the stub portion. The stub portion may have a first cylindrical portion with a first external diameter, a second cylindrical portion with a second, smaller, external diameter and may have a step between the first and second cylindrical portions.

The first portion of the stub portion may comprise the first cylindrical portion. The second portion of the stub portion may comprise the second cylindrical portion.

The second cylindrical portion of the stub portion may comprise said external wall of the stub portion.

The elastomeric portion may be mounted on the stub portion. The first portion of the elastomeric portion may be mounted on the stub portion. The elastomeric portion may be mounted on the first portion of the stub portion. The stub portion may have a third cylindrical portion which has a diameter which is larger than the first cylindrical portion and which is disposed between the first cylindrical portion and the main body of the instrument. The outer surface of the elastomeric portion may be flush with the outer surface of the third cylindrical portion of the stub portion.

The bore provided in the stub portion may be a through bore. One end of the bore may be covered by the elastomeric portion. Another end of the bore may be blanked by a plug which is inserted during assembly. The plug may be inserted after said liquid is introduced into the foot portion via the respective end of the bore. The plug may also serve as a mounting for mounting the foot portion to the main body of the instrument. The plug may be a set screw.

The foot may comprise a load bearing spring one end of which is mounted to the stub and provided within the elastomeric member. Another end of the spring may bear on an internal axial surface of the elastomeric member. Where the elastomeric portion is cup shaped, said other end of the spring may bear on an internal surface of the base portion. Typically the spring will be arranged to take some of the vertical load of supporting the instrument to help reduce creep of the elastomeric member, whilst not impeding lateral movement of the foot portion.

One end of the spring may be provided in the bore of the stub portion, with the other end of the spring projecting out beyond the stub portion.

The stub portion and elastomeric portion may be dimensioned and arranged so as to resist lateral movement of the second portion of the elastomeric portion relative to the first portion of the elastomeric portion by a distance that is greater than said spacing between the internal wall of the elastomeric portion and the external wall of the stub portion.

According to another aspect of the present invention there is provided a load bearing anti-vibration foot portion for mounting to a main body of a spectroscopic instrument for supporting the spectroscopic instrument on a surface, the foot portion comprising a load bearing elastomeric portion and an internal stub portion which is provided within the elastomeric portion and which is rigid compared to the elastomeric portion, wherein an internal wall of the elastomeric portion is spaced from an external wall of the stub portion such that the elastomeric portion is moveable relative to the stub portion to absorb vibration and liquid is provided in the spacing between the internal wall of the elastomeric portion and the external wall of the stub portion to damp such movement.

The foot portion may include any one of, or any combination of, the further features defined above.

According to another aspect of the present invention there is provided a method of making a spectroscopic instrument as defined above or making a load bearing anti-vibration foot portion for mounting to a main body of a spectroscopic instrument as defined above comprising the steps of:

mounting the load bearing elastomeric portion on the internal stub portion;

introducing liquid into the foot portion through a bore in the stub portion; and plugging an end of the bore through which the liquid was introduced.

A plug used in plugging the bore may also be used or usable for mounting the foot portion to the body of a spectroscopic instrument.

The method may comprise further steps corresponding to the further features defined above in respect of the other aspects of the invention.

BRIEF DESCRIPTION OF THE DRAWINGS

Embodiments of the present invention will now be described, by way of example only, with reference to the accompanying drawings in which.

DETAILED DESCRIPTION OF THE PREFERRED EMBODIMENTS

Figure 1:
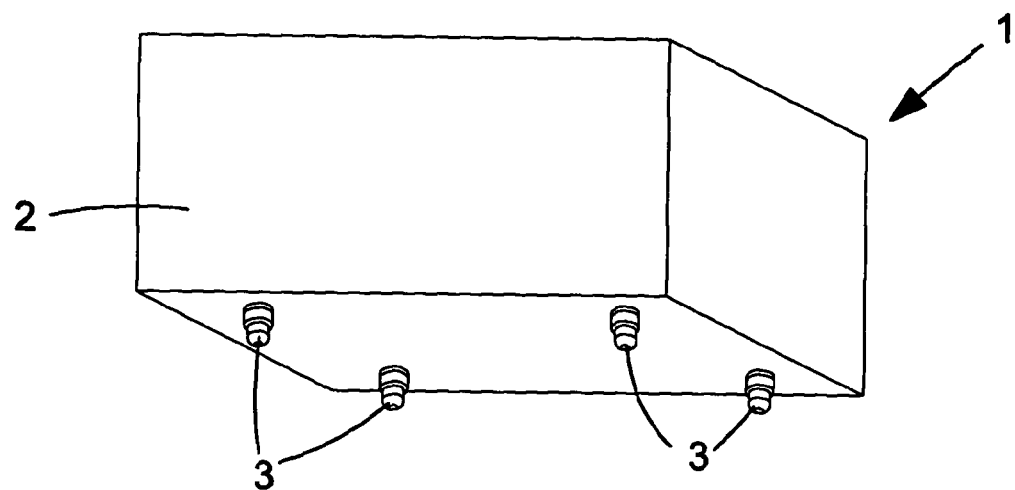
FIG. 1 is a schematic view of a spectroscopic instrument showing its underside which carries four foot portions.

FIG. 1 shows a spectroscopic instrument 1, which in this embodiment is a Fourier Transform spectrometer with a scan mechanism that rotates back and forth around a vertical axis. The instrument comprises a main body 2 and has four supporting foot portions 3 on its underside. Inside the main body of the instrument 2 are the operative parts of the instrument including the scan mechanism as mentioned above. However, the detail of the structure and operation of the internal parts of the instrument 1 are not of any particular interest in relation to the present invention save for the fact that they need to be protected from vibration. Thus detailed drawings and description of the internal working components of the spectrometer 1 are omitted. It will be appreciated that the foot portions 3, which are described in more detail below, could equally be used to protect other spectroscopic instruments with similar requirements for vibration isolation.

Figure 2:
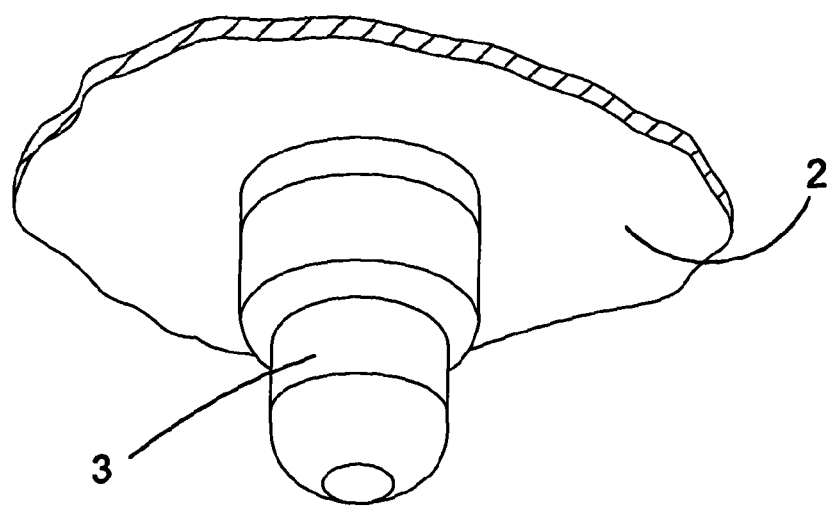
FIG. 2 shows in more detail one of the foot portions of the spectroscopic instrument shown in FIG. 1.
Figure 3:
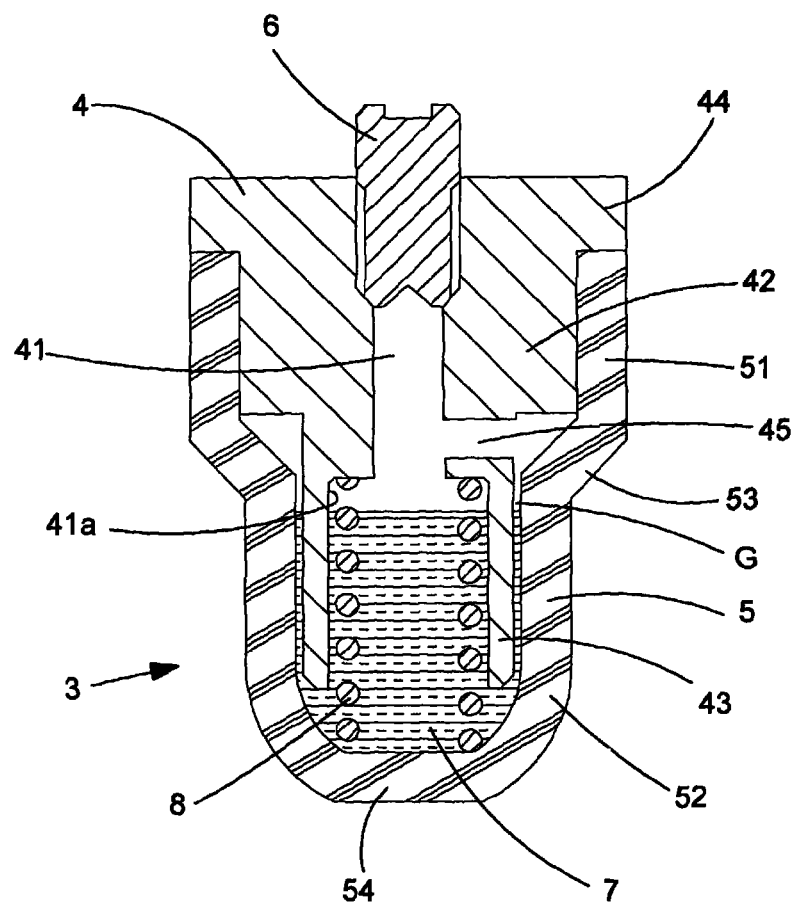
FIG. 3 is a section through the foot portion shown in FIG. 2.

FIG. 2 shows one of the foot portions 3, used to support the spectroscopic instrument 1 of FIG. 1, in more detail and FIG. 3 is a sectional view of the foot portion 3 shown in FIG. 2. The remaining foot portions 3 provided on the spectroscopic instrument 1, in the present embodiment, are the same as the foot portion shown in FIGS. 2 and 3.

Referring particularly to FIG. 3, the foot portion 3 comprises a stub portion 4 (which in this embodiment is of metal) to which is mounted a generally cup shaped elastomeric portion 5. The elastomeric portion 5 is bonded with an adhesive to the stub portion 4.

The stub portion 4 has an internal bore 41. The bore 41 runs along the axis of the stub portion 4 and passes through the whole of its length. A first end of the bore 41 is covered by the elastomeric portion 5 and a second end of the bore 41 is plugged with a plug 6 which, in this embodiment, is in the form of a set screw.

Together the stub portion 4, elastomeric portion 5, and plug 6 form a sealed interior in the foot portion 3. Liquid 7 is provided within this sealed region.

Figure 4:
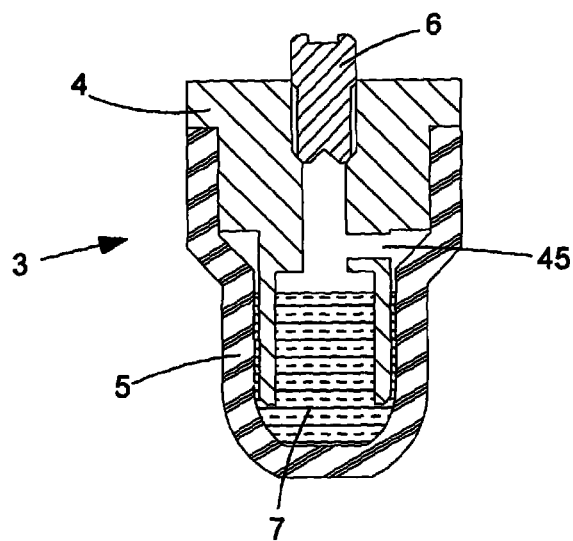
FIG. 4 shows the foot portion of FIGS. 2 and 3 with an internal spring removed.
Figure 5:
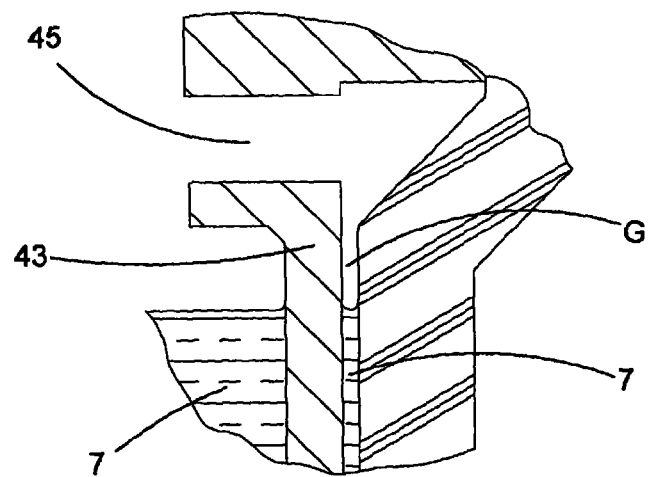
FIG. 5 shows an enlarged detail of part of the foot portion shown in FIG. 4.

A spring 8 is also provided within the interior of the elastomeric portion 5. The spring 8 is shown in position in FIG. 3, but FIG. 4 shows the foot portion 3 with the spring 8 omitted, FIG. 5 shows a detail of the foot portion as shown in FIG. 4 again with the spring omitted. The spring is omitted from FIGS. 4 and 5 partly for reasons of clarity. However, as an alternative to the present embodiment as shown in FIG. 3, it is possible to omit the spring 8 to form an alternative foot portion as illustrated in FIG. 4.

The plug 6 projects from the stub portion 4 as shown in FIG. 3 even when it is fully inserted into the stub 4 so as to seal the interior. A sealing medium, for example PTFE tape, is provided on the plug's 6 thread. The projecting portion of the plug 6 is used in mounting each foot portion 3 to the main body 2 of the spectroscopic instrument 1 as illustrated in FIG. 1.

The stub portion 4 is generally cylindrical with the bore 41 running though its axis. However the stub portion 4 has portions of differing diameter such that its outer surface is stepped. A first cylindrical portion 42 of the stub portion 4 is provided part way along its length and has a first external diameter which is larger than the external diameter of a second cylindrical portion 43 and smaller than the external diameter of a third cylindrical portion (or lip) 44.

The first cylindrical portion 42 can be considered a main body of the stub portion and the elastomeric portion 5 fits closely with the curved surface of this first cylindrical portion 42 and is adhesively bonded to the lip 44.

The second cylindrical portion 43 extends away from the first cylindrical portion 42 into the elastomeric portion 5. The bore 41 is of larger diameter along a substantial portion of this second cylindrical portion 43 of the stub 4. This larger diameter portion 41a of the bore 41 serves to accommodate some of the liquid 7 provided in the foot portion to act as a reservoir and also accommodates the majority of the spring 8.

The spring 8 is located within the enlarged portion 41a of the internal bore 41 and attached to the stub portion in the enlarged portion of the bore 41a. Whilst the spring 8 is attached to the stub portion 4 and guided within the enlarged portion of the bore 41a, the other end of the spring 8 is not attached to the elastomeric portion 5, but rather simply bears on it.

The elastomeric portion 5 has a first cylindrical portion 51, a second cylindrical portion 52 having a smaller internal (and external) diameter than that of the first cylindrical portion 51, and a flared portion 53 between these two portions. Further the elastomeric portion 5 has a base portion 54 which is arranged for contacting the surface on which the instrument 1 carrying the foot portion 3 is to be stood. The base and second cylindrical portion form a lower portion of the elastomeric portion comprising a generally convex outer surface and generally concave inner surface, as shown in FIG. 3.

The elastomeric portion 5 is load bearing in the sense that it supports at least a proportion of the weight of the instrument 1. In the present embodiment, where the spring 8 is provided, the spring 8 will also bear a proportion of the weight of the instrument. In alternatives, as mentioned above, where the spring 8 is omitted, then the elastomeric portion 5 will bear all of the weight which is borne by the foot portion 3.

Note in particular that the foot portion 3 is constructed and arranged so that in normal usage the weight of the instrument 1 will not be borne through the stub portion 4. In particular it will not be borne through the second cylindrical portion 43 of the stub portion. In other words the foot is arranged so that in normal usage the elastomeric member 5, and in particular the base portion 54 of the elastomeric member 5, will not contact with the axial end of the stub portion 4.

The second cylindrical portion 52 of the elastomeric member 5 is arranged so as to closely surround but be spaced from the second cylindrical portion 43 of the stub portion 4. As such there is a spacing or gap G between the external wall of the second cylindrical portion of the stub portion 4 and the internal wall of the second cylindrical portion 52 of the elastomeric portion 5. This gap G may be most clearly seen in FIG. 5. Again, as most clearly can be seen in FIG. 5, this annular spacing G is occupied to a predetermined depth (dependent upon the amount of liquid 7 in the foot) by the liquid 7 when the foot portion 3 is in its normal orientation for supporting the instrument 1. The liquid 7 in the reservoir, including that in the enlarged portion of the bore 41a is free to flow into and out of the gap G via the open end of the enlarged portion of the bore 41a.

A vent aperture 45 is provided in the stub portion 4. The vent aperture 45 is provided through the side wall of the second cylindrical portion 43 of the stub portion such that there is a fluid communication path from above the liquid level in the bore 41 to above the liquid level in the region between the stub portion 4 and elastomeric member 5.

It will be appreciated that in use when the elastomeric member 5 tends to move relative to the stub portion 4 due to vibrations and so on, then the existence of the liquid 7 in the spacing G will tend to damp such movement. The vent aperture 45 serves to avoid any air lock problems occurring in the spacing G to ensure that this functionality is not inhibited.

It will also be noted that the second cylindrical portion 43 of the (metal) stub portion 4 will be considerably more rigid than the elastomeric portion 5. Due to the spacing G, the stub portion 4 (in particular the second cylindrical portion 43 of the stub portion 4) does not prevent transverse movement of the elastomeric portion 5 (in particular the second cylindrical portion 52 and the base portion 54) relative to the stub portion 4 whilst these movements are small. However, any large movement which might otherwise take place (i.e. a movement greater than the spacing G) will be resisted and in normal circumstances prevented by the presence of the second cylindrical portion 43 of the stub portion 4 extending down into the elastomeric portion 5. Thus the arrangement of the stub portion 4, elastomeric portion 5, and liquid 7 in the spacing therebetween serve to both damp vibrational movements which the foot portion may incur, and (in practical terms) prevent excessive translational movement which might otherwise occur for example when the instrument 1 is slid across the supporting surface. Accordingly these features can provide good damping by allowing the elastomeric material 5 to be soft to maximise the vibration protection delivered, whilst avoiding potentially hazardous or alarming wobbling of the instrument 1 during normal use and slumping of foot portions 3 during movement of the instrument 1.

As alluded to above, the end of the spring 8 (which is not mounted in the second cylindrical portion 43 of the stub portion 4) bears against an internal axial surface of the elastomeric portion 5 at its base portion 54. This allows the spring 8 to provide some vertical load bearing assistance to help prevent the elastomeric portion 5 creeping and hence reducing in height over time. On the other hand the arrangement provides very little interference to the transverse or horizontal compliance of the foot portion 3. This is largely due to the fact that the spring 8 tends not to resist such transverse movement to any large degree.

To assemble the foot portion shown in FIG. 3, the spring 8 is first fitted into the bore 41 of the stub portion 4. The elastomeric portion 5 is then fitted over the first cylindrical portion 42 of the stub portion and glued at its end to the third cylindrical portion (or lip) 44. At this stage the foot portion 3 is pressure tested to ensure the integrity of the seal. Following this, the interior of the foot portion, in particular the bore 41, is filled with liquid 7, such as high viscosity silicone fluid, up to a level just below the vent aperture 45. The plug (set screw) 6 is then inserted into the correspondingly tapped portion of the bore 41 and lockingly sealed with a thread lock of PTFE tape. At this stage the foot portion 3 is complete and can be attached to the instrument 1 using the projecting portion of the plug 6.

As will be appreciated, the viscosity of the liquid 7, softness of the elastomeric portion 5 and spacing G between the elastomeric portion 5 and stub portion 4 may be chosen to give different degrees of strength and vibration isolation characteristics.

Note that the flared design of the elastomeric portion 5 helps to increase horizontal, or transverse, compliance of the foot portion 3. In alternatives a foot portion 3 which is not flared in this way might be used.

In alternatives the stub portion may be of plastics material, which then may be a moulded plastics part. The plastics material would be chosen so as to be rigid compared to the elastomeric portion.

The invention claimed is:

1. A spectroscopic instrument comprising at least one load bearing anti-vibration foot for supporting the instrument on a surface, the foot comprising a load bearing elastomeric portion and an internal stub portion for mounting to a main body of the spectroscopic instrument, the stub portion being mounted within the elastomeric portion and being rigid compared to the elastomeric portion, wherein the elastomeric portion comprises a lower portion that contacts the surface on which the instrument is to be supported, an upper portion, and an angled intermediate portion that connects the upper and lower portions, the lower portion having a generally convex outer surface and generally concave inner surface, the stub portion having a first portion and a second portion stepped from the first portion, wherein the elastomeric portion is mounted on the first portion of the stub portion, and wherein the second portion extends downwardly from the first portion into the lower portion of the elastomeric portion, wherein the foot further comprises a load bearing spring mounted within the second portion of the stub portion, and wherein an internal wall of the elastomeric portion is spaced from an external wall of the second portion of the stub portion such that the elastomeric portion is moveable transversely relative to the second portion of the stub portion to absorb vibration whilst presence of the second portion of the stub portion restricts transverse movement of the elastomeric portion and liquid is provided in the spacing between the internal wall of the elastomeric portion and the external wall of the stub portion to damp such movement.

2. A spectroscopic instrument according to claim 1, wherein the first portion of the stub portion has a larger transverse extent than the second portion of the stub portion.

3. A spectroscopic instrument according to claim 1 in which the first and second portions of the stub portion are each generally cylindrical, an external diameter of the second portion being smaller than the external diameter of the first portion.

4. A spectroscopic instrument according to claim 1 in which an end of the spring bears on the internal wall of the elastomeric portion.

5. A spectroscopic instrument according to claim 1 in which the upper portion has a larger transverse extent than the lower portion.

6. A spectroscopic instrument according to claim 5 in which the stub portion and elastomeric portion are dimensioned and arranged so as to resist lateral movement of the lower portion of the elastomeric portion relative to the upper portion of the elastomeric portion by a distance that is greater than said spacing between the internal wall of the elastomeric portion and the external wall of the stub portion.

7. A spectroscopic instrument according to claim 1 in which the upper portion of the elastomeric portion comprises a hollow cylindrical portion with a first internal diameter, and in which the lower portion of the elastomeric portion comprises a hollow cylindrical portion with a second internal diameter, the second internal diameter being smaller than the first internal diameter.

8. A spectroscopic instrument according to claim 1 in which the stub portion comprises an internal bore, the internal bore defining a liquid reservoir.

9. A spectroscopic instrument according to claim 8 in which a vent aperture is provided in the stub which allows fluid communication between a region in the bore of the stub which is above a level of the liquid reservoir in the bore during operation and a region between the external wall of the stub portion and the internal wall of the elastomeric portion which is above a level of the liquid in the spacing between the external wall of the stub portion and the internal wall of the elastomeric portion during operation.

10. A spectroscopic instrument according to claim 8 in which the bore provided in the stub portion is a through bore, one end of the bore being covered by the elastomeric portion and another end of the bore being blanked by a plug which is inserted during assembly.

11. A spectroscopic instrument according to claim 10 in which the plug also serves as a mounting for mounting the foot portion to the main body of the instrument.

12. A load bearing anti-vibration foot for mounting to a main body of a spectroscopic instrument for supporting the spectroscopic instrument on a surface, the foot comprising a load bearing elastomeric portion and an internal stub portion for mounting to a main body of the spectroscopic instrument, the stub portion being mounted within the elastomeric portion and being rigid compared to the elastomeric portion, wherein the elastomeric portion comprises a lower portion that contacts the surface on which the instrument is to be supported, an upper portion, and an angled intermediate portion that connects the upper and lower portions, the lower portion having a generally convex outer surface and generally concave inner surface, the stub portion having a first portion and a second portion stepped from the first portion, wherein the elastomeric portion is mounted on the first portion of the stub portion, and wherein the second portion extends downwardly from the first portion into the lower portion of the elastomeric portion, wherein the foot further comprises a load bearing spring mounted within the second portion of the stub portion, and wherein an internal wall of the elastomeric portion is spaced from an external wall of the second portion of the stub portion such that the elastomeric portion is moveable transversely relative to the stub portion to absorb vibration whilst presence of the second portion of the stub portion restricts transverse movement of the elastomeric portion and liquid is provided in the spacing between the internal wall of the elastomeric portion and the external wall of the stub portion to damp such movement.

13. A method of facilitating control of vibration in a spectroscopic instrument, the method comprising:
providing a load bearing anti-vibration foot, the load bearing anti-vibration foot comprising a load bearing elastomeric portion and an internal stub portion for mounting to a main body of the spectroscopic instrument, the stub portion being mounted within the elastomeric portion and being rigid compared to the elastomeric portion, wherein the elastomeric portion comprises a lower portion that contacts a surface on which the instrument is to be supported, an upper portion, and an angled intermediate portion that connects the upper and lower portions, the lower portion having a generally convex outer surface and generally concave inner surface, the stub portion having a first portion and a second portion stepped from the first portion, wherein the elastomeric portion is mounted on the first portion of the stub portion, and wherein the second portion extends downwardly from the first portion into the lower portion of the elastomeric portion, wherein the foot further comprises a load bearing spring mounted within the second portion of the stub portion, and wherein an internal wall of the elastomeric portion is spaced from an external wall of the second portion of the stub portion such that the elastomeric portion is moveable transversely relative to the stub portion to absorb vibration whilst presence of the second portion of the stub portion restricts transverse movement of the elastomeric portion and liquid is provided in the spacing between the internal wall of the elastomeric portion and the external wall of the stub portion to damp such movement; and mounting the load bearing anti-vibration foot to the main body of the spectroscopic instrument.

* * * * *